(12) United States Patent
Barve et al.

(10) Patent No.: US 8,375,724 B2
(45) Date of Patent: *Feb. 19, 2013

(54) METHOD OF OPERATING A MULTI-FUEL COMBUSTION SYSTEM

(75) Inventors: Vinayak V. Barve, Orlando, FL (US); Jianfan Wu, Orlando, FL (US); Ulrich Wörz, Oviedo, FL (US); Jaap Van Kampen, Roermond (NL)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/502,588

(22) PCT Filed: Oct. 18, 2010

(86) PCT No.: PCT/EP2010/065591
§ 371 (c)(1),
(2), (4) Date: Apr. 18, 2012

(87) PCT Pub. No.: WO2011/048035
PCT Pub. Date: Apr. 28, 2011

(65) Prior Publication Data
US 2012/0227412 A1    Sep. 13, 2012

Related U.S. Application Data

(63) Continuation of application No. 12/581,966, filed on Oct. 20, 2009.

(51) Int. Cl.
*F02C 3/30* (2006.01)
*F02C 7/00* (2006.01)
*F02C 3/20* (2006.01)

(52) U.S. Cl. ............. 60/775; 60/39.55; 60/39.463
(58) Field of Classification Search .......... 60/39.3, 60/39.55, 734–748, 772, 775, 776
See application file for complete search history.

(56) References Cited

U.S. PATENT DOCUMENTS

| | | | | |
|---|---|---|---|---|
| 5,317,861 | A | * | 6/1994 | Fox et al. .............. 60/775 |
| 6,393,823 | B1 | * | 5/2002 | Badeer ................ 60/778 |
| 2004/0172951 | A1 | | 9/2004 | Hannemann |
| 2008/0083229 | A1 | | 4/2008 | Haynes |

* cited by examiner

*Primary Examiner* — Ehud Gartenberg
*Assistant Examiner* — Arun Goyal

(57) ABSTRACT

A method of operating a multi-fuel combustion system is provided. The method includes a first phase and a second phase, wherein the first phase includes providing ignition to a combustor basket to ignite a first type of fuel, where the first type of fuel is supplied to the combustor basket through a first conduit. Also in first phase steam is also supplied to the first conduit in addition to the first type of fuel and steam is supplied to the second conduit after the ignition. In the second phase a second type of fuel is supplied to the combustor basket through the second conduit after ignition of the first fuel through the first conduit, while stopping the supply of the first fuel, and continuing to supply steam through both the first and second conduits.

14 Claims, 3 Drawing Sheets

METHOD OF OPERATING A MULTI-FUEL COMBUSTION SYSTEM

CROSS REFERENCE TO RELATED APPLICATIONS

This application is the US National Stage of International Application No. PCT/EP2010/065591, filed Oct. 18, 2010, which is a continuation of U.S. application Ser. No. 12/581,966 filed Oct. 20, 2009. All of the applications are incorporated by reference herein in their entirety.

FIELD OF INVENTION

The present invention lies in the field of combustion turbines in particular for generating electrical energy and more particularly, a method of operating a combustor system.

BACKGROUND OF INVENTION

Future energy demand, scarcity of available fuels and environmental regulations put pressure on power plant producers to come up with solutions for safe, efficient and clean ways to generate power. The scarcity of fuels mainly applies to oil and to a lesser extend to natural gas. With an availability of coal in abundance, electricity production from coal is mostly done using steam power plants. A cleaner and more efficient option to generate power from coals is to use them in an integrated gasification combine cycle (IGCC). In an IGCC, coals are first gasified to yield syngas, consisting mainly of CO (carbon monoxide) and $H_2$ (hydrogen).

Syngas typically has a significantly lower calorific value as compared to conventional natural gas fuels. By removing the CO content from the syngas prior to combusting it, one also has an effective means for $CO_2$ (carbon-dioxide) capture. The IGCC concept with pre-combustion $CO_2$ capture is one of the most cost-effective ways to produce electricity and avoid the emission of $CO_2$ in the future. The economical potential of the IGCC plant with $CO_2$ capture can increase even further when natural gas prices rise faster than expected or with increased carbon tax regulation.

Due to the low calorific value and high hydrogen content, the combustion of syngas fuels requires the development of adapted or completely new combustion systems which are able to handle the wide range of syngas fuels, and produce little emissions and can handle the high reactivity of the fuels.

The syngas fuel composition depends on the type of gasifier used and on whether or not the CO is separated from the fuel. Besides syngas fuels, the combustion system might run on a second conventional fuel for backup and start up. The ideal possibility is to have all the different types of fuels combusted in a stable way by one combustion system by performing a proper combustion method to increase the efficiency and compensate for the efficiency loss due to the gasifier.

SUMMARY OF INVENTION

In view of the foregoing, an embodiment herein includes a method of operating a multi-fuel combustion system comprising a first phase and a second phase, wherein the first phase comprises: providing ignition to a combustor basket to ignite a first type of fuel, where the first type of fuel is supplied to the combustor basket through a first conduit; supplying steam to the first conduit in addition to the first type of fuel and supplying steam to the second conduit after the ignition; and wherein the second phase comprises: supplying a second type of fuel to the combustor basket after ignition of the first fuel through the second conduit, while stopping the supply of the first fuel.

BRIEF DESCRIPTION OF THE DRAWINGS

The present invention is further described hereinafter with reference to illustrated embodiments shown in the accompanying drawings, in which.

DETAILED DESCRIPTION OF INVENTION

In general terms, a combustion turbine comprises three sections: a compressor section, a combustor section having a typical combustor basket and a turbine section. Air drawn into the compressor section is compressed. The compressed air from the compressor section flows through the combustor section where the temperature of the air mass is further increased after combustion of a fuel. From the combustor section the hot pressurized gas flow into the turbine section where the energy of the expanding gases is transformed into rotational motion of a turbine rotor that drives an electric generator.

The lower calorific value of the syngas fuels and the necessity to also operate the burner on a backup fuel like natural gas, significantly affects the design of the burners. The burner should be able to handle large fuel mass flows and the fuel passages consequently need to have a large capacity. A too small capacity results in a high fuel pressure drop. Due to the large fuel mass flow involved, a high pressure drop has a much larger impact on the total efficiency of the engine as compared to a typical natural gas fired engine.

Figure 1:
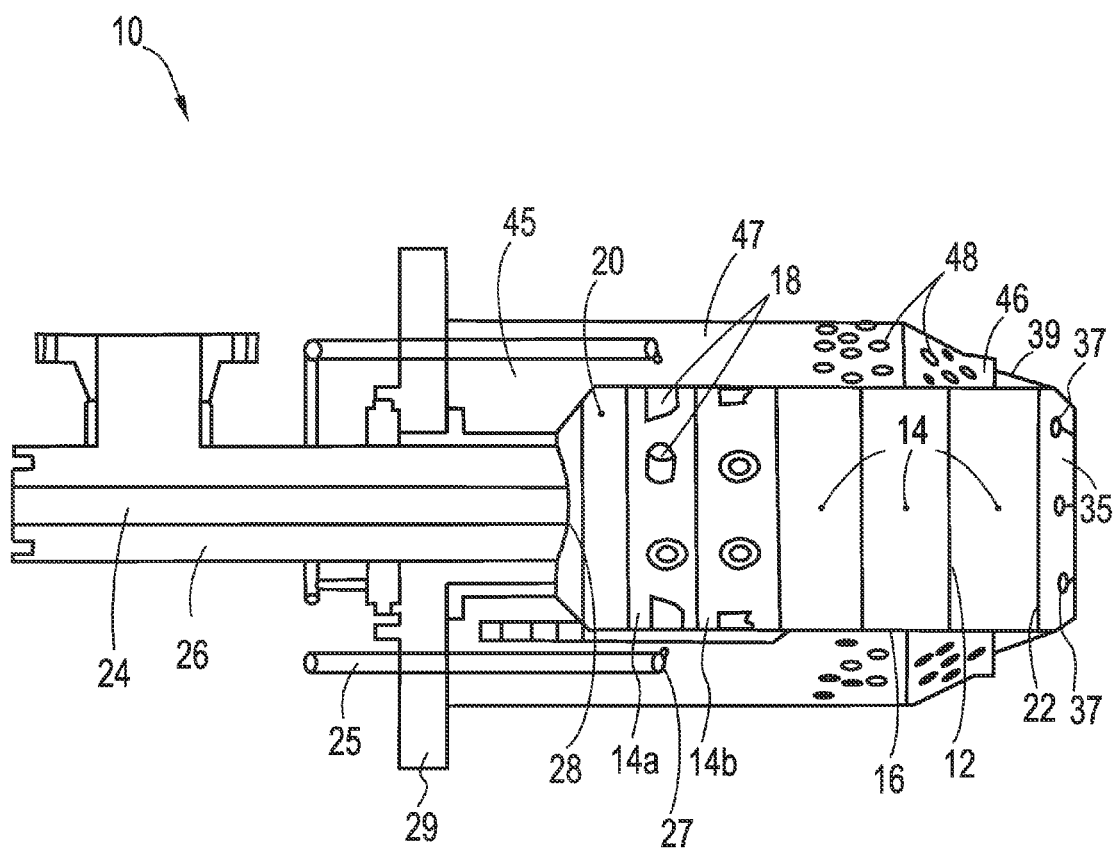
FIG. 1 illustrates a longitudinal cross-section of the multi-fuel combustion system based on an embodiment of the invention.

FIG. 1 illustrates a cross-sectional view of the multi-fuel combustion system 10 according to one embodiment of the invention. A multi-fuel combustion system 10 comprises a combustor basket 12. The wall 16 of the combustor basket 12 is made of multiple cylindrical regions 14 arranged to overlap each other at the transition and extends from an upstream end 20 to a downstream end 22 of the combustor basket. The upstream end 20 of the combustor basket is close to the region, where the fuel conduits generally supply the fuels for the combustion and the down stream end is the region, where the gas after combustion flows out to of the combustor basket to a turbine section. The combustion system 10 is designed to combust at least two type of fuels, for example natural gas and syngas. The types of fuels that could be used are not restricted to natural gas and syngas and hence the combustion system 10 could use other fuels for combustion.

FIG. 1 further shows a first conduit 24 adapted to provide a first type of fuel, for example natural gas, directly to the combustor basket 12 and the second conduit 26 is adapted to provide a second type of fuel, for example syngas directly to the combustor basket 12. Also there is at last one third conduit 25 adapted to inject at least one of the first type of fuel and the second type of fuel through one or multiple openings 18 into the combustor basket 12. There could be more than one conduit to provide each type of fuel to the combustor basket based on the design and requirement. For example, there could be multiple third conduits 25 to supply the fuel through multiple openings 18 in the combustor basket 12. Also based on the mode of operation of the combustor basket 12, each of the conduits is adapted to handle a different fuel. Even the conduits could handle multiple fuels at the same point of time. The second conduit 26 is positioned to encircle the first conduit 24 or concentrically arranged for effective delivery of the fuels. The first conduit 24 is positioned coaxially, and internally, of a larger diameter second conduit 26. Since the diameter of the second conduit 26 is greater that the first conduit 24, the said second conduit 26 can handle low calorific value fuels of larger volumes since large fuel mass flows is needed to achieve a certain thermal power input.

The third conduit 25 is adapted to inject at least one of the first type of fuel and the second type of fuel into a compressor discharge air that flow through at least one of the openings 18 associated with at least one of the cylindrical regions 14. The third conduit 25 has a fuel injector nozzle 27 at the end having 1 to 5 injector holes that are aimed at an angle of 0 to 90° relative to a centerline of the opening 18. The first conduits 24 and the second conduit 26 under consideration consist of concentric circles of circular holes at the region of nozzle 28 of the conduits which acts as injectors for the fuels. The nozzle 28 helps to inject the respective fuels directly into the combustor basket 12 and is positioned at the upstream end 20 of the combustor basket 12.

Figure 2:
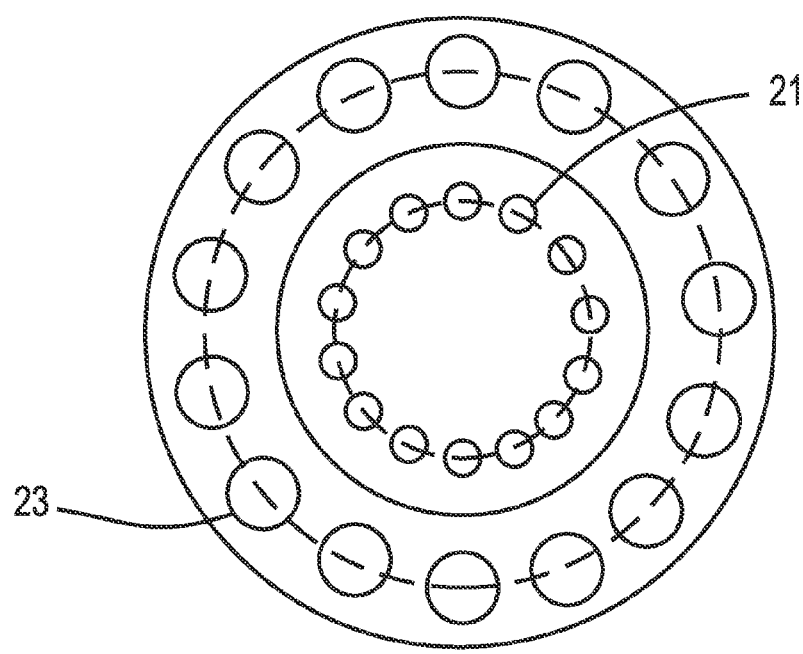
FIG. 2 shows fuel injector holes at the region of nozzle of the first and the second conduits.

FIG. 2 shows explicitly these two rows of concentric holes at the region of nozzle 28. Each circle of rows is associated to a conduit. The inner row of holes 21 corresponds to the first conduit 24 and the outer row of holes 23 corresponds to the second conduit 26. The number of injectors in each conduit can vary, for example between 8 to 18 holes, but is not restricted to this numbers. A preferred embodiment having 14 injectors for both conduits is shown in FIG. 2. The holes can be clocked relative to each other or can be inline.

In another preferred embodiment, the holes in the region of nozzle 28 of the first conduit 24 comprises multiple holes positioned at, at least two different radial distances from the center of the nozzle for injecting a fuel flow into a region of combustion in the combustor basket 12. This nozzle design promotes a greater amount of fuel flow towards the center of the nozzle, which cools the nozzle in a cost effective and simple manner. Most importantly the hole arrangement maintains the aerodynamic performance of the nozzle.

Figure 3:
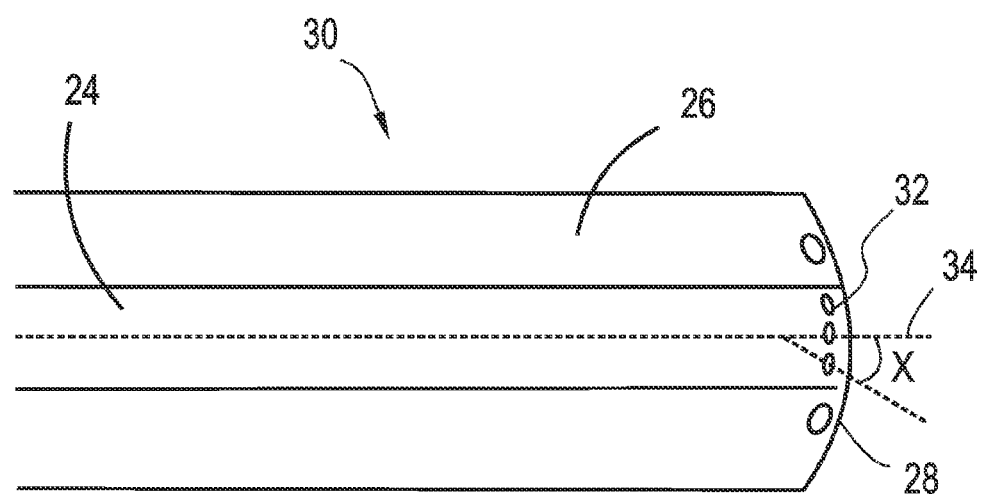
FIG. 3 shows the side view of the first conduit and the second conduit along with the fuel injector holes.

FIG. 3 shows the side view of the first conduit and the second conduit along with the fuel injector holes. The fuel injector holes 32 in the nozzle region 28 of the first conduit 24 and the second conduit 26 can be positioned radially at an angle X, between 0-45 degrees relative to a burner axis 34.

Coming back to FIG. 1, the circumferential wall 16 of the combustor basket 12 comprises multiple openings 18. At least two of the cylindrical regions 14a and 14b nearer to the upstream end 20 of the combustor basket 12 further comprise multiple openings 18 distributed along the circumference of the respective cylindrical regions. This multiple openings 18 allow a compressor discharge air from a compressor stage to flow towards a region of combustion in the combustor basket. At the same time, at least one of the cylindrical region near to the downstream end 22 of the combustor basket 12 may also comprise plurality of openings 18 distributed along the circumference of the cylindrical region to allow the compressor discharge air to flow towards a region of combustion in the combustor basket 12. The combustion system 10 further comprises a cover plate 29 coupled to the combustor basket 12 and the first, second and third conduits. This enables the combustor basket and the conduits to be attached to a casing. The multi-fuel combustion system 10 further comprises a flow conditioner 45 positioned to encircle the combustor basket 12 and having a conical section 46 and a cylindrical section 47 having plurality of holes 48 adapted to allow the compressor discharge air to flow towards a region of combustion in the combustor basket 12. The flow conditioner 45 is used to achieve the pressure drop required for cooling and to provide a uniform air flow towards the region of combustion in the combustor basket 12. Holes 48 in both the cylindrical section 47 and the conical section 46 are used as flow passage for air. The multi-fuel combustion system 1 of FIG. 1 further comprises an exit cone 35 at the downstream end 22 of the combustor basket 12 having multiple slots 37 aligned to the plurality of openings 18 associated with at least one of the cylindrical regions 14. This exit cone 35 is intended to improve the mixing between the hot combustion gasses and the cold air flow coming out of a spring-clip passage 39. The improved mixing between these flows lead to better CO emissions. The exit cone slots 37 aligned with the scoops 18 prevent overheating of the exit cone 35.

Figure 4:
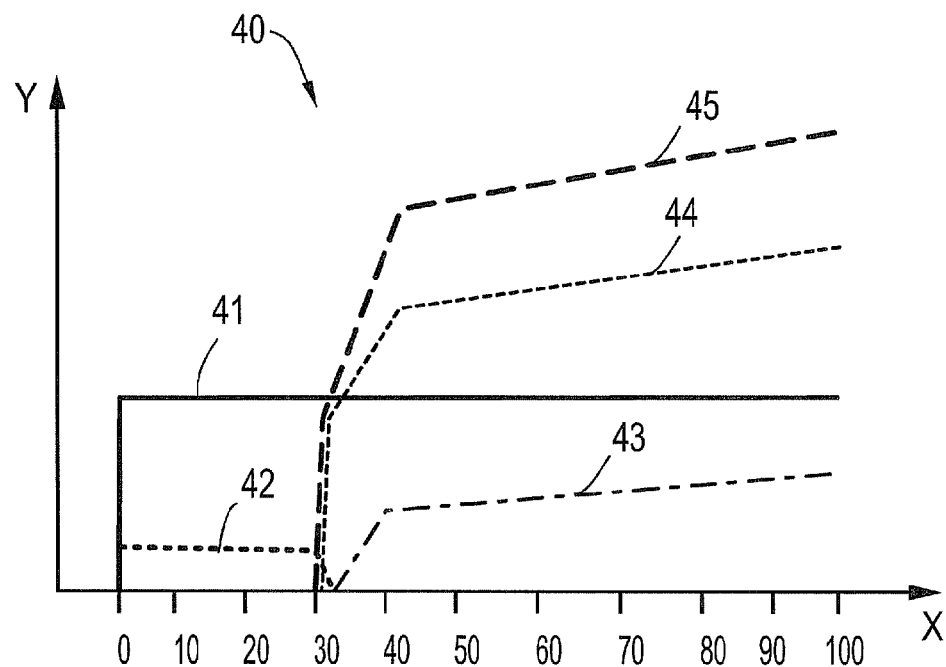
FIG. 4 shows the graphical representation depicting the first phase of operation of the multi-fuel combustion system based on an embodiment of the invention.

The method of operating the multi-fuel combustion system 10 is now described. The operation could be divided into two main phases a first phase and a second phase. FIG. 4 shows a graph 40 depicting the first phase of operation of the multi-fuel combustion system based on an embodiment of the invention. The X-axis represents the load of the combustion system in percentage, where 0 represents the idle stage and 100 represent the full load. Y-axis represents the fuel flow through the nozzle of the conduits.

During the first phase an ignition is provided to a combustor basket 12 by an ignition coil to ignite a first type of fuel, for example natural gas supplied to the through the first conduit 24. The line 41 represents the flow of a first fuel type through the first conduit 24. Natural gas, could be used as a first type of fuel during the start up of this first stage. At this point there might not be any need for any purging of the second conduit 26.

The method further involves supplying a medium, for example an inert gas, nitrogen or steam or seal air to the second conduit 26 during the first phase for stabilizing the combustion system 10 for any pressure difference in the combustor basket 12. In a typical industrial arrangement the combustion system comprises a plurality of combustor baskets, and while in operation there could be pressure differences that could be built up between these combustor baskets. The supply of the medium also takes care of this pressure difference in the combustor basket due to this type of arrangement. Line 42 in the graph 40 represents the supply of the medium. The method also involves supplying steam to the first conduit 24 in addition to the first type of fuel and supplying steam to the second conduit 26 after the ignition. Line 43 represents the steam supply through the first conduit 24 and line 44 represents the steam supply through the second conduit 26. Hence in the first conduit 24, the steam gets mixed with the first type of fuel. Steam is provided to the second conduit 26 at a time earlier than the steam provided to the first conduit 24. The medium, for example the seal gas can be taken from the combustion system 10, by making use of the pressure differences that exist in the system. About 25% of the steam is injected through the first conduit 24 and the rest through the second conduit 26. Overall steam mass flow injection rate increases to a maximum at base load when using the first type of fuel. The steam ratio between the first conduit 24 and the second conduit 26 could change between 10/90% and 40/60%. Line 45 in the graph 40 represents the combined total steam flow in both the conduits. Generally, supplying the steam into the first conduit and the second conduit starts when the combustion system is loaded between 25% and 40% of its full working capacity. This can also vary based on the condition of operation or based on the design or requirement. Meantime the supply of the medium in the second conduit 26 is shut off once the steam supply is stabilized in the first conduit 24 and the second conduit 26 during the first stage of operation.

Figure 5:
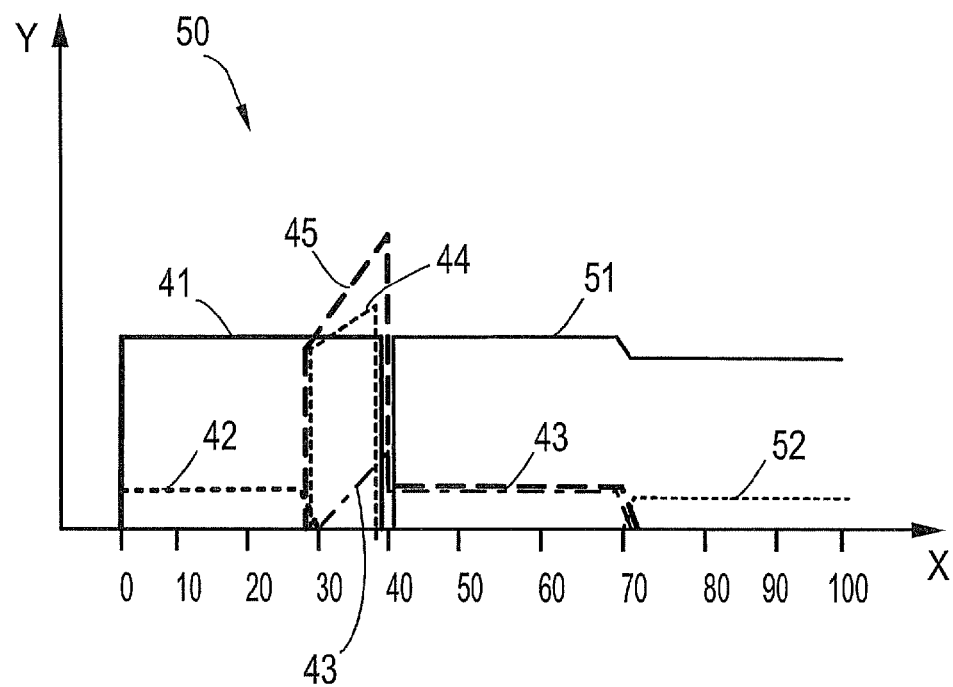
FIG. 5 shows the graphical representation of the second phase along with the first phase of operation of the multi-fuel combustion system based on an embodiment of the invention.

FIG. 5 shows a graph 50 representing a second phase along with the first phase of operation of the multi-fuel combustion system based on an embodiment of the invention. In the second phase of operation, a second type of fuel for example syngas is supplied to the combustor basket 12 through the second conduit 26, while stopping the supply of the first fuel. If there is a pre-combustion $CO_2$ capture employed in the design, then the second type of fuel supplied could be a H2 fuel. Line 51 in the graph 50, shows the supply of second type of fuel through the second conduit 26. The supply of the second type of fuel through the second conduit 26 to the combustor basket 12 could starts when the combustion system is loaded generally between 30% and 50% of its full working capacity.

The method further comprises supplying a portion of the second type of fuel to the combustor basket 12 through the first conduit 24 during the second phase. Line 52, in the graph 50 represent the supply of the portion of the second type of fuel to the through the first conduit 24. This increases the syngas flow area and reduces the fuel supply pressure demand and the portion of the second type of fuel also acts as purging medium for the first conduit 24. If first conduit is not used for supplying of the portion of the second type of fuel, a medium like for example steam, nitrogen or air could be used as a purging medium. Between 40% and 70% load, this purging is done. 100% of the second type of fuel may be supplied through the second conduit 26 at lower loads. Above 70% load, the first conduit 24 is generally used for supplying the second type of fuel. The portion of the second type of fuel supplied through the first conduit during the second phase is between 0% and 20%, but preferably between 1% and 20% of the total mass flow of the second type of fuel supplied during the operation of the combustion system during the second phase. The steam is continuously supplied in the first conduit 24 from the first phase until the beginning of supplying the portion of the second type of fuel through the first conduit 24 during the second phase. Here steam also acts as a purging medium.

Also the third conduit 25 may also be used to supply any one of the first or second type of fuel for enabling an effective and more complete combustion by introducing the said fuels through the openings 18 if required. This further helps in reducing NOx emissions. The syngas, which is the second type of fuel is diluted for NOx control. The dilution amount varies over the load range.

It is noted that by the end of the first stage and the onset of the second stage the first fuel type is stopped and the combustor system 10 is provided with a second type of fuel. There is a fuel transfer occurring in the combustor system 10. To do this, the level of the syngas, which is the second type of fuel through the second conduit 26 is brought up from the minimum and gradually increased while reducing the supply of natural gas, which is the first fuel type through the first conduit 24. Steam will be supplied through the first conduit 24 for keeping the pressure drop in the first conduit 24 constant and for maintaining NOx targets. The syngas is diluted if the lower heat value (LHV) of the fuel at the second conduit 26, is higher than the require LHV. Once the natural gas flow reaches to a minimum, the natural gas flow is shut off, and steam is continued to be used as purging medium or else purged with N2. When the load level is higher than 70%, then upto 20% of the syngas can be directed to the first conduit 24 and the purging medium in the first conduit can be shut down.

In a pre-combustion $CO_2$ capture employed design, when the $CO_2$ sequestration process starts, the syngas operation automatically changes to $H_2$ operation. When the $CO_2$ sequestration process stops, the $H_2$ operation automatically changes to syngas operation. The dilution levels are monitored and controlled to meet NOx emission target. The Syngas/$H_2$ operation could be brought again back to natural gas operation if required by reducing the syngas/$H_2$ in the second conduit 26 when the load level is larger than 70%, and by starting the supply of natural gas in the first conduit 24 to compensate for the pressure difference. Steam injection in the first conduit 24 is used to maintain pressure drop and control NOx. Steam injection in second conduit 26 is used to replace syngas. Once the syngas in the second conduit 26 reaches the allowable minimum, then syngas is shut down.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A method of operating a multi-fuel combustion system, for a gas turbine engine, including a first phase and a second phase, the method comprising:
   providing the first phase, which comprises:
      providing ignition to a combustor basket to ignite a first type of fuel, where the first type of fuel is supplied to the combustor basket through a first conduit;
      supplying steam to the first conduit in addition to the first type of fuel and supplying steam to a second conduit after the ignition; and
   providing the second phase, which comprises:
      supplying a second type of fuel to the combustor basket through the second conduit after ignition of the first fuel through the first conduit, while stopping the supply of the first fuel, and continuing to supply steam through both the first and second conduits.

2. The method according to claim 1, wherein the steam is provided to the second conduit at a time earlier than the steam provided to the first conduit.

3. The method according to claim 1, further comprising supplying a medium to the second conduit during the first phase for stabilizing the combustion system for any pressure difference between the second conduit and the combustor basket.

4. The method according to claim 3, further comprising shutting off the supply of the medium in the second conduit once the steam supply is stabilized in the first conduit and the second conduit during the first phase.

5. The method according to claim 1, further comprising supplying a portion of the second type of fuel to the combustor basket through the first conduit during the second phase.

6. A method according to claim 5, further comprising continue supplying the steam in the first conduit from the first phase until the beginning of supplying the portion of the second type of fuel through the first conduit during the second phase.

7. The method according to claim 5, wherein the flow of the second type of fuel in the second conduit is regulated based on the portion of the flow of the second type of fuel in the first conduit during the second phase.

8. The method according to claim 5, wherein the portion of the second type of fuel supplied through the first conduit during the second phase is between 1% and 20% of the total mass flow of the second type of fuel supplied during the operation of the combustion system during the second phase.

9. The method according to claim 5, wherein the first type of fuel is natural gas.

10. The method according to claim 5, wherein the second type of fuel is syngas.

11. The method according to claim 1, wherein supplying the steam into the first conduit and the second conduit starts when the combustion system is loaded between 25% and 40% of its full working capacity.

12. The method according to claim 1, wherein supplying a second type of fuel through the second conduit to the combustor basket at the second phase starts when the combustion system is loaded between 30% and 50% of its full working capacity.

13. The method according to claim 1, wherein at least one of the first type of fuel and the second type of fuel is supplied to the combustion system using a third conduit.

14. The method according to claim 1, wherein the combustion system uses a pre-combustion $CO_2$ capture process.

* * * * *